(12) United States Patent
Carbaugh

(10) Patent No.: US 7,775,770 B2
(45) Date of Patent: Aug. 17, 2010

(54) PITCH BEARING CONTAINMENT SEAL

(75) Inventor: Steven R. Carbaugh, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 908 days.

(21) Appl. No.: 11/643,318

(22) Filed: Dec. 21, 2006

(65) Prior Publication Data

US 2008/0152497 A1    Jun. 26, 2008

(51) Int. Cl.
*B64C 27/00* (2006.01)

(52) U.S. Cl. ............... 416/155; 416/174; 277/551; 277/569; 277/572; 277/630; 277/634; 277/652

(58) Field of Classification Search ............... 415/171.1; 416/155, 159, 174; 277/569, 570, 630, 634, 277/635, 636, 652
See application file for complete search history.

(56) References Cited

U.S. PATENT DOCUMENTS 3,997,805 A * 12/1976 Dochterman ............... 310/90
4,007,972 A * 2/1977 Baylor ...................... 305/102
6,126,321 A * 10/2000 Fetty et al. ................. 384/459
2004/0070151 A1* 4/2004 Klenk et al. ............... 277/391
2005/0171248 A1* 8/2005 Li et al. ..................... 524/35

FOREIGN PATENT DOCUMENTS

| FR | 2518210 A | * | 6/1983 |
| GB | 974175 A | * | 11/1964 |
| GB | 2192953 A | * | 1/1988 |
| WO | PCT/US 2007/088463 | | 12/2007 |

* cited by examiner

*Primary Examiner*—Edward Look
*Assistant Examiner*—Aaron R Eastman
(74) *Attorney, Agent, or Firm*—Tung & Associates

(57) ABSTRACT

A flexible, resilient seal protects a bearing in a pitch joint of a helicopter blade assembly from contaminants. The seal includes a flexible, resilient body having a first end bonded to a stationary portion of the joint, and a second end biased into sealing engagement with a displaceable portion of the joint. The body includes an intermediate bellows section surrounding the bearing that expands and contracts to accommodate displacement between the stationary and movable portions of the joint. The second end of the seal includes a lip that rubs on a sacrificial wear layer formed on the second portion of the joint.

24 Claims, 7 Drawing Sheets

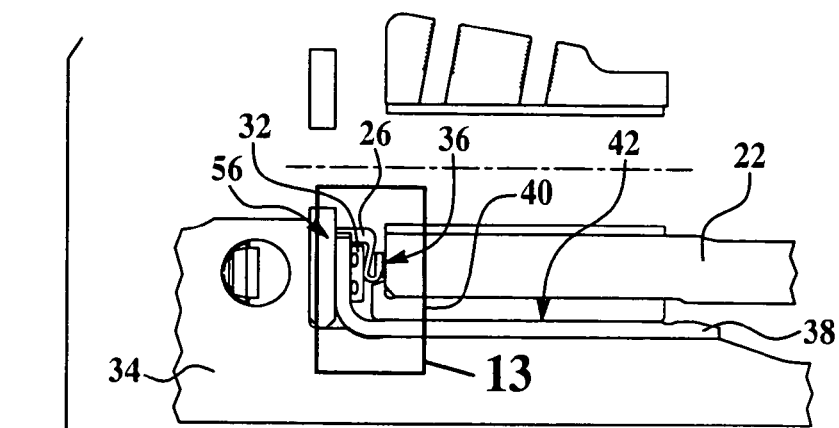
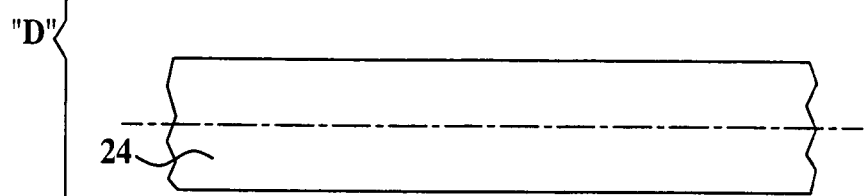
FIG. 5
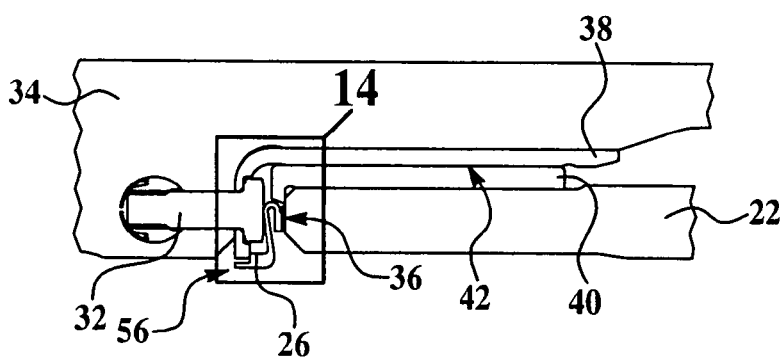
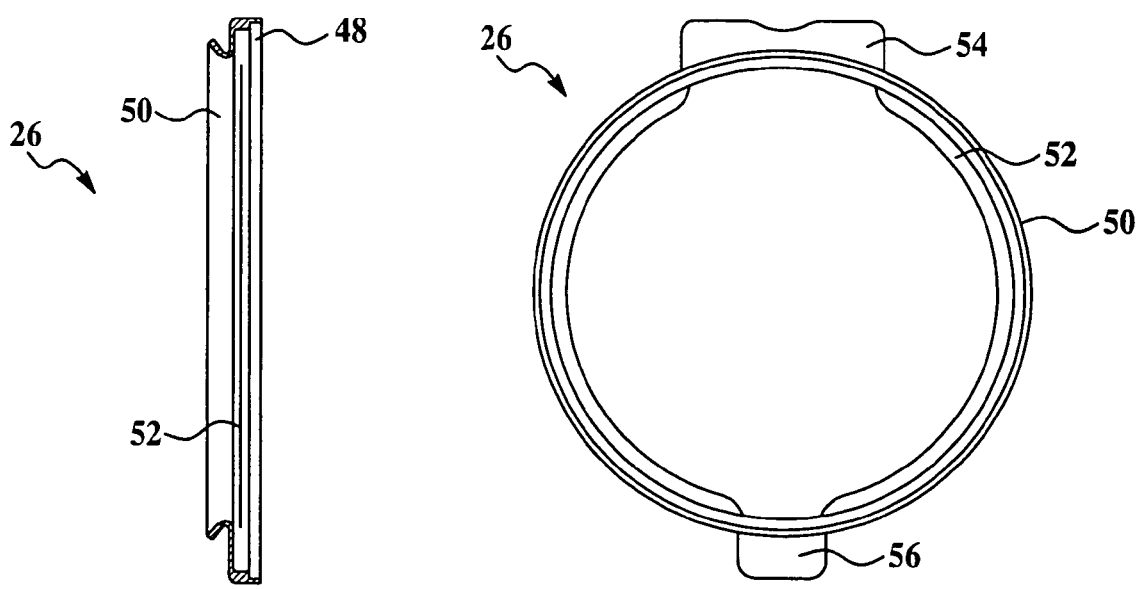
FIG. 6  FIG. 7

PITCH BEARING CONTAINMENT SEAL

FEDERALLY SPONSORED RESEARCH OR DEVELOPMENT

This invention was made with government support under contract number DAAH01-99-3-R001 awarded by the U.S. Army Aviation and Missile Command (AMCOM). The government has certain rights in this invention.

BACKGROUND OF THE INVENTION

1. Technical Field

This invention generally relates to rotor blade assemblies for aircraft such as helicopters, and deals more particularly with a seal for protecting bearings in pitch joints of the blade assembly from contaminants.

2. Description of the Related Art

Helicopter aircraft employ a pitch joint that allows a main rotor blade to change its angle of attack or pitch. The ability to change the pitch on a rotor blade is essential to the operation of a helicopter. Pitch joints operate in a demanding mechanical environment due to high loads and rapid movement of the blades. Moreover, the loading on the pitch joint can reverse direction with every rotation of the rotor blade, depending upon whether the blade is advancing or retreating with respect to the movement of the helicopter.

The bearings in pitch joints often operate under hostile environmental conditions, and require lubrication in order to reduce wear. For maintenance and other reasons, dry lubricated bearing technologies are sometimes used to lubricate pitch bearings. Dry lubrication bearing technologies employ a low friction coating applied to a bearing metallic substrate that is one of two moving surfaces forming the bearing. The movements between the two surfaces wear away the coating on the bearing. During the wear, some of the low friction coating is transferred from the bearing to the mating part, which is often a sleeve. This transfer of the coating is essential for the correct operation of a dry lubricated bearing. In effect, the two moving surfaces of the bearing both become covered with low friction material during normal operation of the bearing system. Once the transfer of wear debris is established, the wear rate is dramatically reduced, and the life of the bearing is increased.

The reversing loading nature of the pitch joint places high demands on dry lubricated bearing technologies, especially when repeated gaps occur between the bearing surfaces as a result of loading reversal. Gaps between the bearing surfaces allow the wear debris to be flushed from the bearing joint, thus eliminating the transfer coating that has been transferred to the non-bearing member. Each time the pitch joint is flushed of wear debris, the system must redeposit a transfer coating to the non-bearing surface, thereby diminishing the amount of the low friction coating that remains on the bearing surface. As the low friction coating on the bearing wears, the gap that is created during load reversal increases over time, exacerbating the problem.

The problem of rapid wear of the low friction coating is further amplified where environmental contaminants such as water, sand or dust enter the joint and flush out the transfer debris at a faster rate than that caused by simple movement of air through the joint. In addition, debris such as sand and dust may become embedded in the relatively soft, low friction coating, thereby increasing friction which reduces the bearings' operating life.

Previous pitch joint designs have incorporated a seal directly on surfaces of the pitch joints. While this arrangement may be effective in some applications, it is difficult or impossible to add this type of seal construction after the pitch joint has been assembled, such as in a retrofit application.

Accordingly, there is a need for a bearing seal which effectively protects the bearing against environmental contaminants, yet which has mechanical properties and a physical configuration that does not interfere with the normal movement and operation of the pitch joint. The present invention is directed toward satisfying this need.

BRIEF SUMMARY OF THE INVENTION

In accordance with one aspect of the invention, a contaminant seal is provided for a pitch bearing for a pitch joint in a helicopter rotor blade assembly. The contaminant seal comprises a unitary body protectively covering the pitch bearing. The body includes a first end, a second end and an intermediate section between the first and second ends. The first end is secured to a stationary part of the pitch joint while the second end has a lip that slideably engages a moveable portion of the joint. The intermediate section is axially expandable between the stationary and moveable portions of the pitch joint, and urges the second end of the seal into constant sealing engagement with the moveable portion of the joint. The intermediate section of the seal includes a flexible bellows that allows the body to expand in a direction toward the moveable portion of the joint. The second end of the seal includes a lip having a rub surface that rubs against a wear coating deposited on the moveable portion of the joint. The intermediate section of the seal comprises a resilient material held in compression between the stationary and moveable portions of the joint so that constant force is imposed on the lip to maintain the seal.

In accordance with another aspect of the invention, a seal is provided for protectively sealing a bearing in a pitch control joint used in a helicopter rotor blade assembly. The seal includes a first and second ends, and a resilient, intermediate section compressed between the first and second ends. The first end is secured to a stationary portion of the joint and forms a generally annular closure at the first end. The flexible second end engages and seals against a displaceable portion of the joint, forming a generally annular closure at the second end. The intermediate section of the seal protectively surrounds the bearing and biases the second end into continuous sealing engagement with the displaceable portion of the joint.

In accordance with still another aspect of the invention, a seal is provided for protecting a pitch control bearing from environmental contaminants. The seal comprises an annularly shaped body protectively surrounding the bearing and having first and second ends respectively forming first and second closures between the body and the joint. The body includes a flexible, resilient portion held in compression within the joint, which is expandable with the joint to maintain the first and second closures when the joint expands. The seal may be formed from a hydrogenated rubber.

The bearing seal of the present invention advantageously seals a dry lubricated bearing against intrusion by environmental contaminants, without interfering with the normal operation of the pitch joint. The use of resilient bellows in the seal produces a spring-like force that causes the seal to remain in tight sealing engagement with a moveable portion of the joint. The material properties of the seal are highly compatible with sacrificial wear coatings applied to the joint that create wear debris which contribute to joint lubrication.

These and further features, aspects and advantages of the embodiments will become better understood with reference to the following illustrations, description and claims.

BRIEF DESCRIPTION OF THE SEVERAL VIEWS OF THE DRAWINGS

FIG. 5 is an enlarged view of the area designated as 5 in FIG. 4.

FIG. 6 is a side elevational view of the seal.

FIG. 7 is a view of one end of the seal.

DETAILED DESCRIPTION OF THE INVENTION

Figure 1:
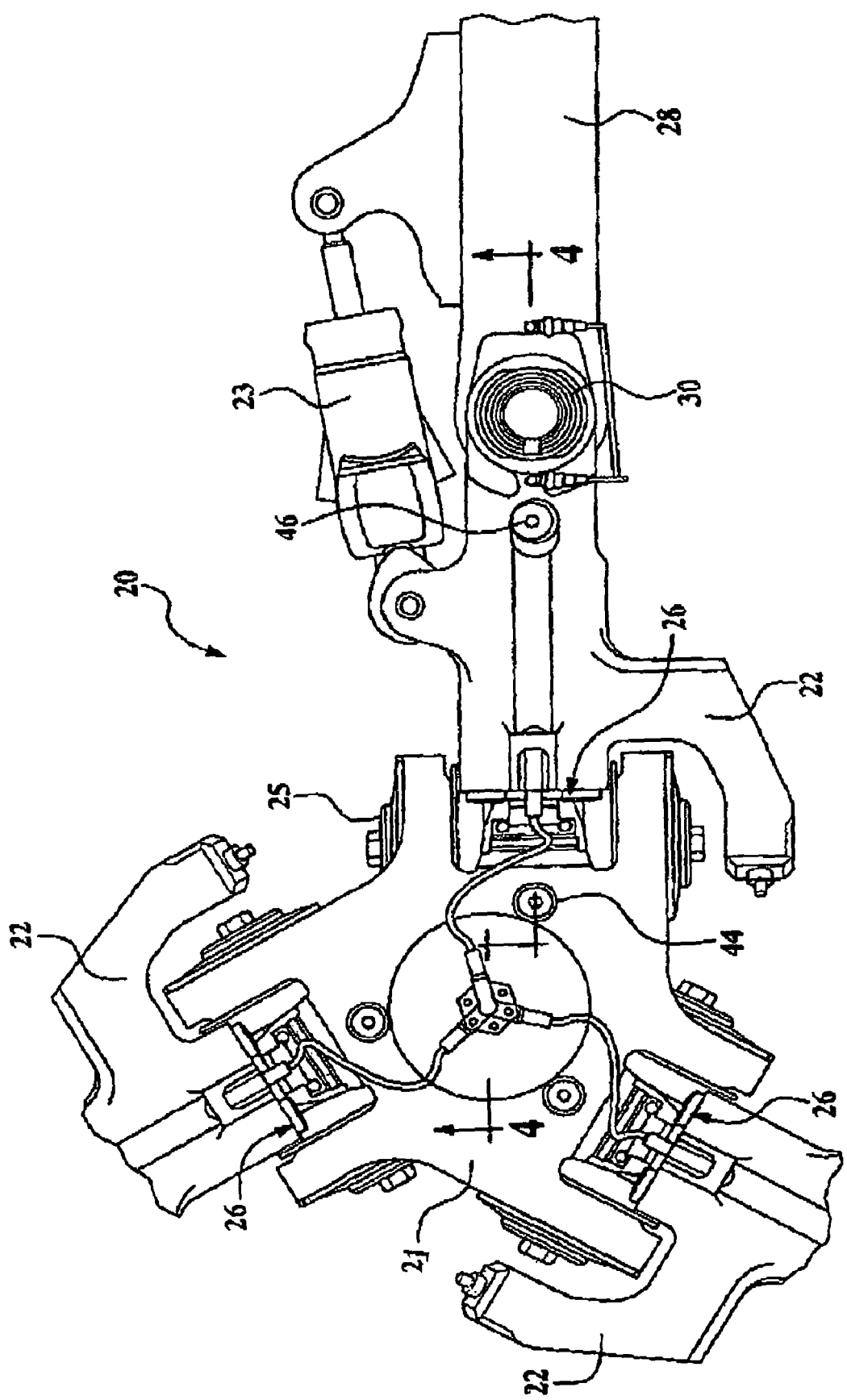
FIG. 1 is a fragmentary, plan view of a rotor blade assembly for a helicopter, having pitch joints employing a bearing contaminant seal in accordance with the present invention.
Figure 2:
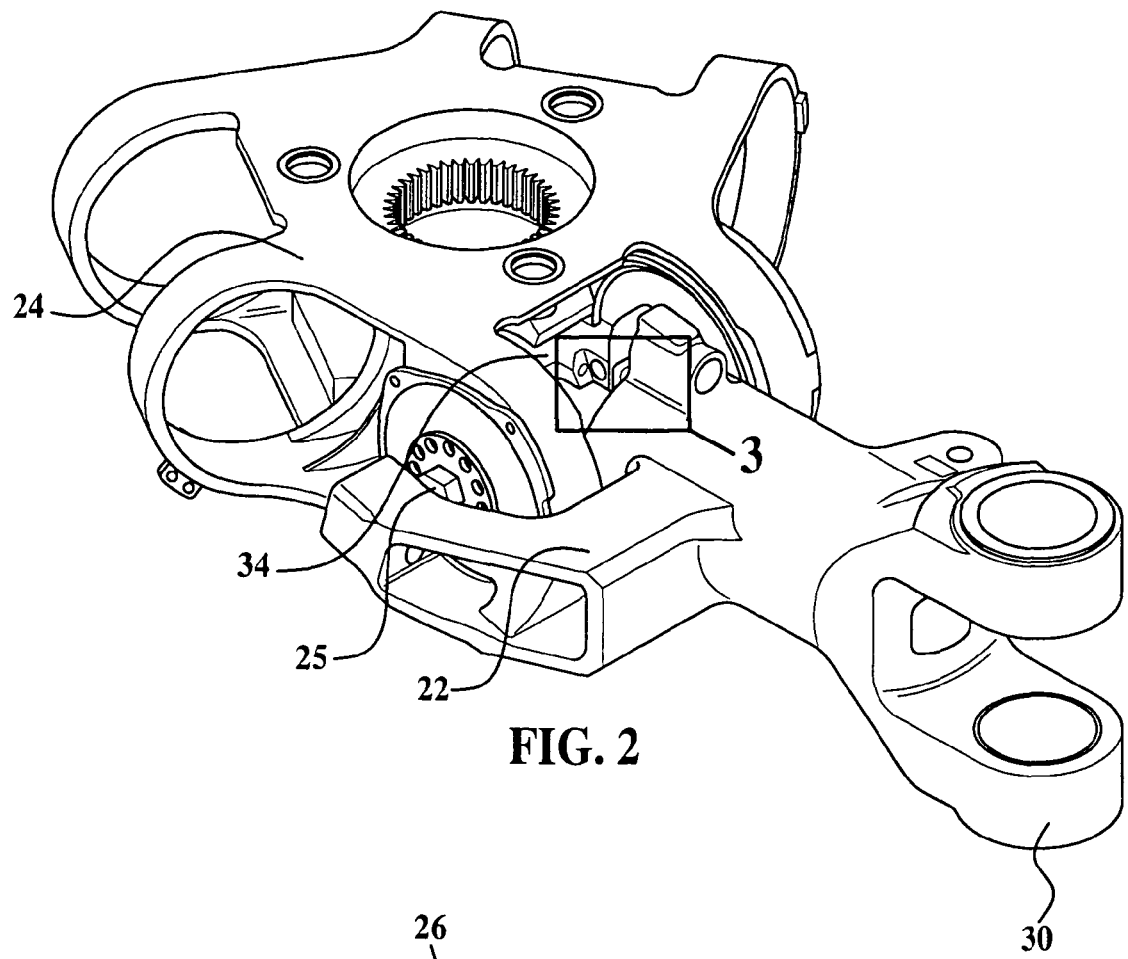
FIG. 2 is a perspective view of the main rotor hub forming part of the assembly shown in FIG. 1, and depicting a single pitch housing.
Figure 3:
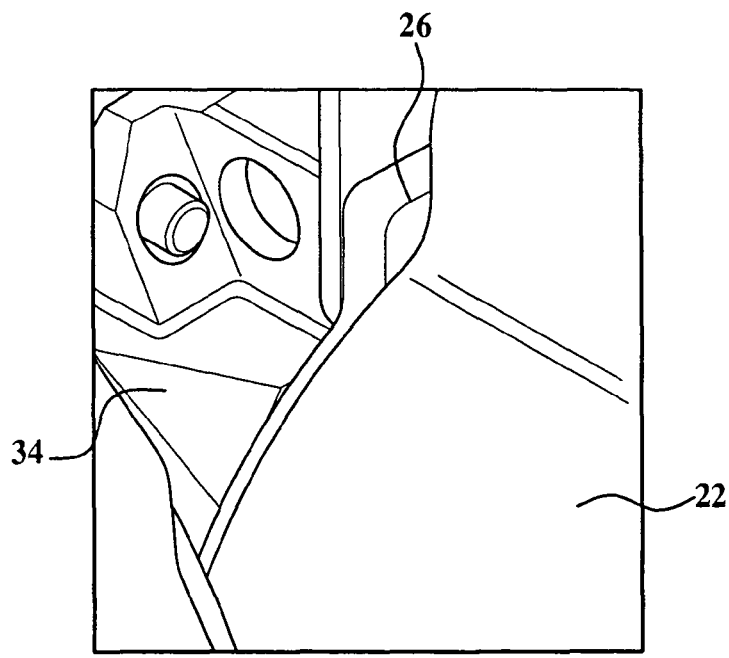
FIG. 3 is an enlarged, perspective view of the area designated as 3 in FIG. 2.
Figure 4:
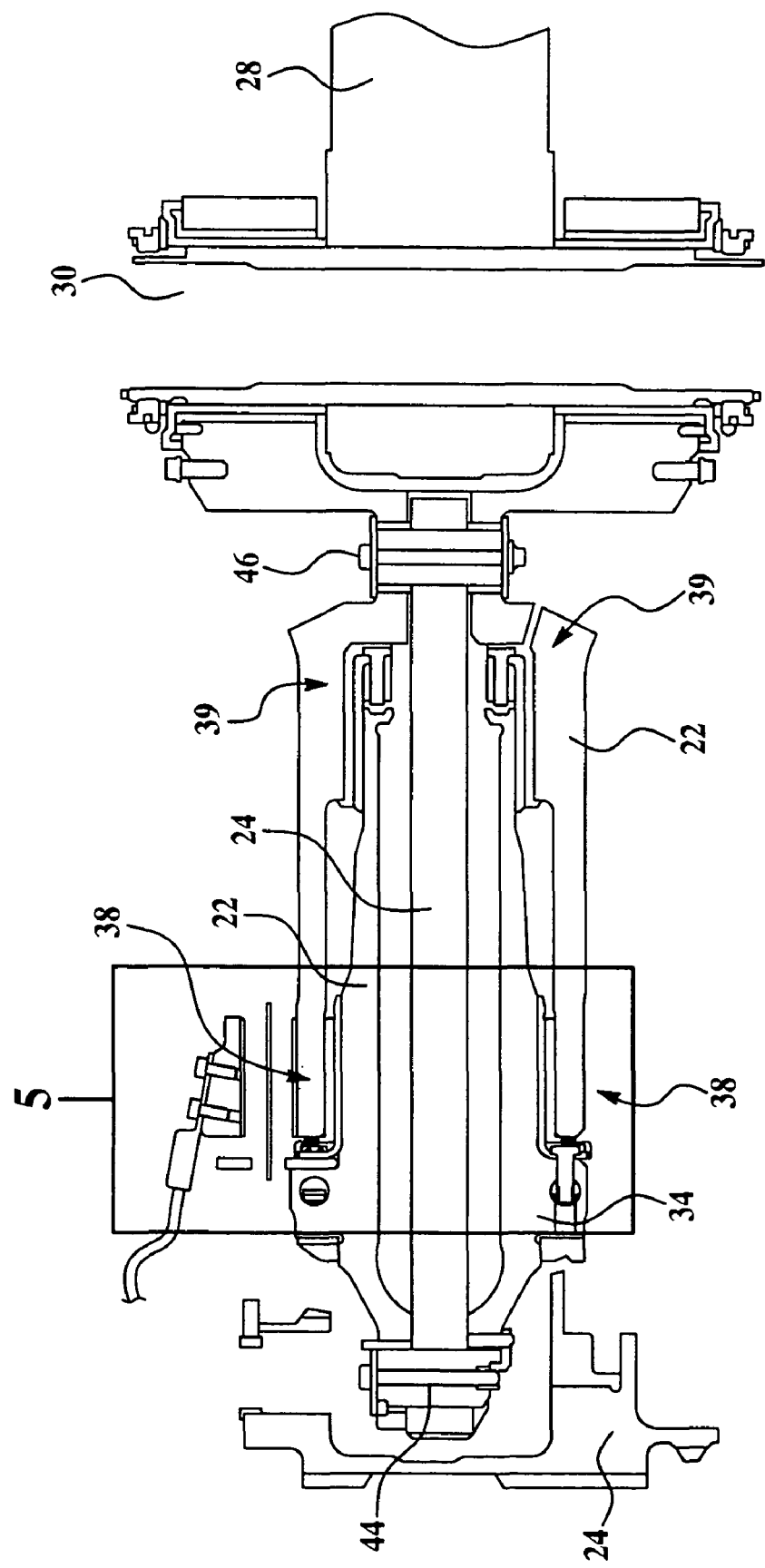
FIG. 4 is a sectional view taken along the line 4-4 in FIG. 1.

Referring to FIGS. 1-5, a main rotor blade assembly generally indicated by the numeral 20 in FIG. 1 may be used in rotating wing aircraft, such as a helicopter. The rotor blade assembly 20 includes a main rotor hub 21, three pitch housings 22, three lag dampers 23 and three blades 28. The components shown in FIG. 1 comprise a fully articulated rotor system in which the rotor blades 28 are permitted pitching, flapping and lead-lag movement about respective pitch, flap and lead-lag axes. Lead-lag blade movement is produced using lead-lag hinges 30, and flap movement is produced using flap hinges 25.

A tie bar 24 is connected at its opposite ends to the hinges 25, 30 by connecting pins 44, 46. A pitch shaft 34 is contained within the pitch housing 22. The pitch housing 22 and pitch shaft 34 each have generally circular cross sections and are connected together by means of an inboard pitch bearing 38 and an outboard pitch bearing 39. As best shown in FIG. 5, the inboard pitch bearing 38 is generally L shaped in cross section and is secured to the pitch shaft 34 by means of a fastener 32. A sleeve 40 of suitable material that compliments the low friction pitch bearing 38 is received within one end of the pitch housing 22 surrounding the pitch bearing 38. A low friction coating 42 deposited on the pitch bearing 38 reduces friction between the pitch bearing 38 and the sleeve 40. The interface between the low friction coating 42 on bearing 38 and the inside face of the sleeve 40 form a bearing surface between the pitch shaft 34 and the pitch housing 22 which is lubricated by means of the low friction coating 42.

In accordance with the present invention, a bearing contaminant seal 26 protectively encloses the pitch bearing 38, and surrounds an annular gap between the end of the pitch housing 22 and the pitch shaft 34. As will be described below, the seal 26 is formed of a flexible, resilient material and is held in a compressed state between the end of the pitch housing 22 and the pitch shaft 34. By virtue of its resiliency and geometry, the seal 26 expands in the direction of its length when the gap between the pitch housing 22 and pitch shaft 34 increases when the rotor assembly 20 is in a dynamic state, i.e., rotating at high speed.

Referring now also to FIGS. 6-12, seal 26 includes a unitary body, formed, as by molding, of a resilient, synthetic flexible material preferably hydrogenated nitrial butadiene rubber (HNBR). HNBR has been found to exhibit desirable properties in aircraft applications and is particularly resistant to degrading by environmental contaminants. HNBR is highly impervious, both at high and low temperatures to virtually all potential contaminants found in aircraft applications, including sunlight, humidity, sand, jet fuel, etc.

Figure 8:
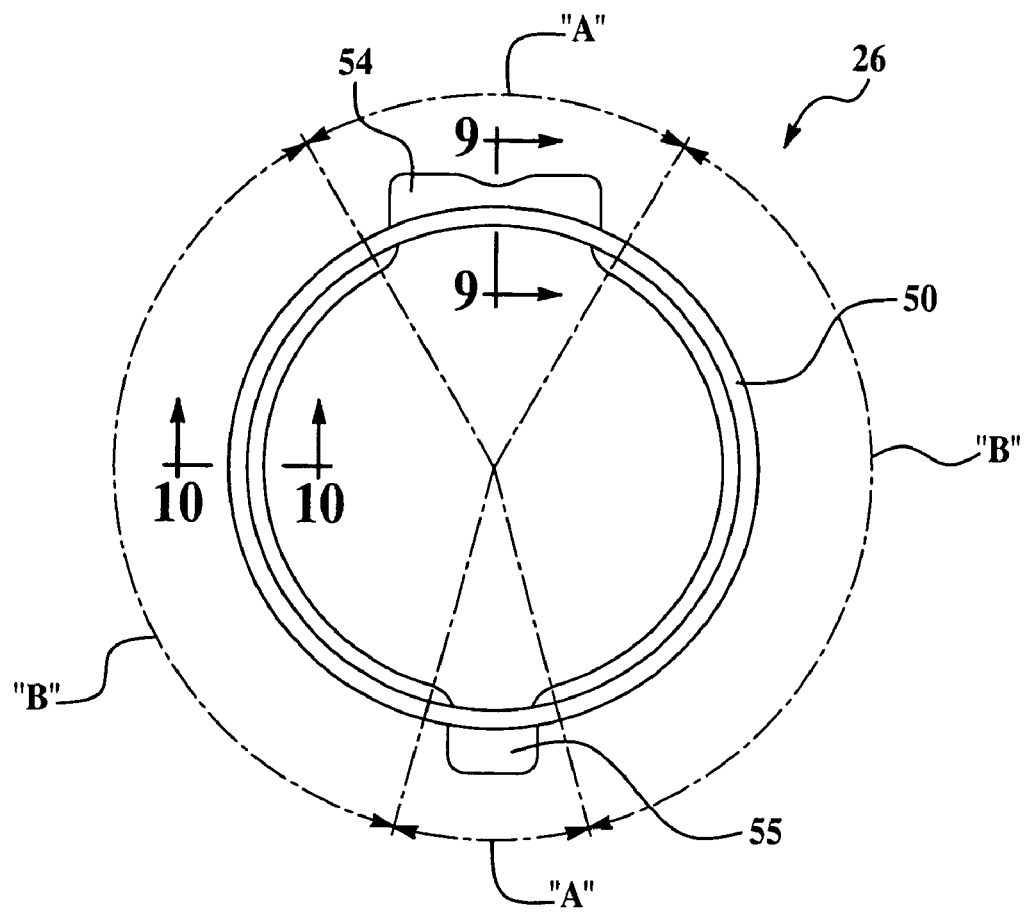
FIG. 8 is a view similar to FIG. 7, but showing the areas of the seal that have similar cross section geometries.
Figure 9:
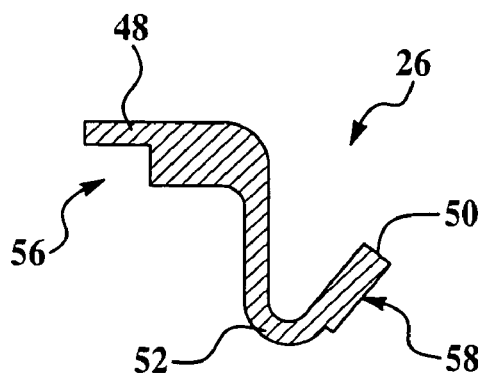
FIG. 9 is a sectional view taken along the line 9-9 at FIG. 8.
Figure 10:
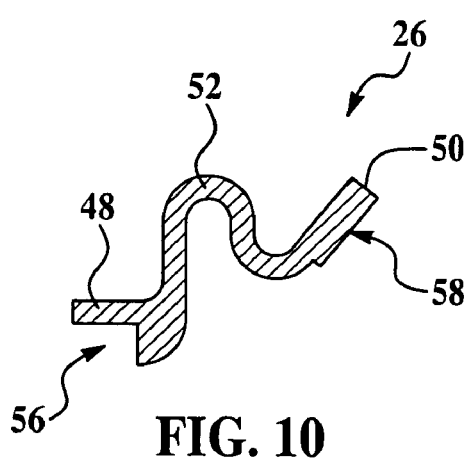
FIG. 10 is a sectional view taken along the line 10-10 in FIG. 8.
Figure 11:
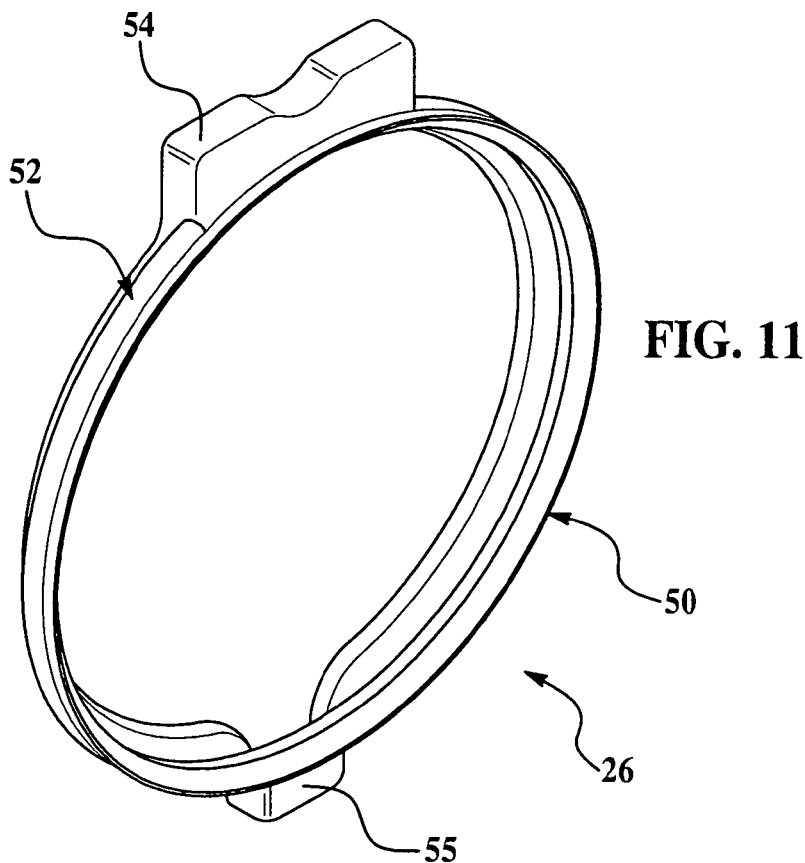
FIG. 11 is a perspective view of one side of the seal.
Figure 12:
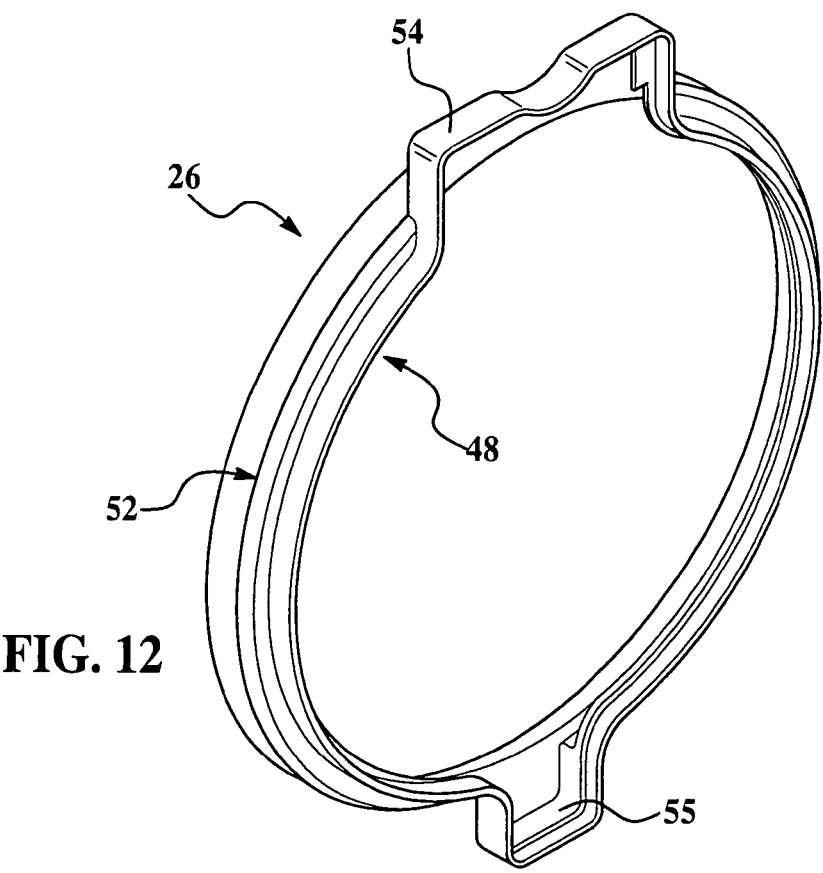
FIG. 12 is a perspective view showing the opposite side of the seal.

The seal 26 includes a first end 48, a second, opposite end 50, and an intermediate section 52 between the ends 48, 55. The first end 48 is bonded around its entire periphery, using a suitable adhesive, to the pitch bearing 38, as best seen in FIG. 5. The first end 48 includes two sections 54, 56 which are radially enlarged in order to cover the fasteners 32. The second end 50 includes a lip having a rub surface 58 which extends around the entire periphery of the second end 50. The intermediate section 52 of the seal 26 contains a bellows-like fold whose function will be described below. As a result of the geometry of the seal 26 described above, the cross section of the seal 26 varies between the configuration shown in FIG. 9, and the configuration shown in FIG. 10. The cross sectional geometry shown in FIG. 9 extends circumferentially in 60 degree and 30 degree sections designated as "A" in FIG. 8. Similarly, the remaining periphery of the seal 26 as shown in FIG. 8, designated by "B" extends around the remaining 270 degrees of the seal 26.

Figure 13:
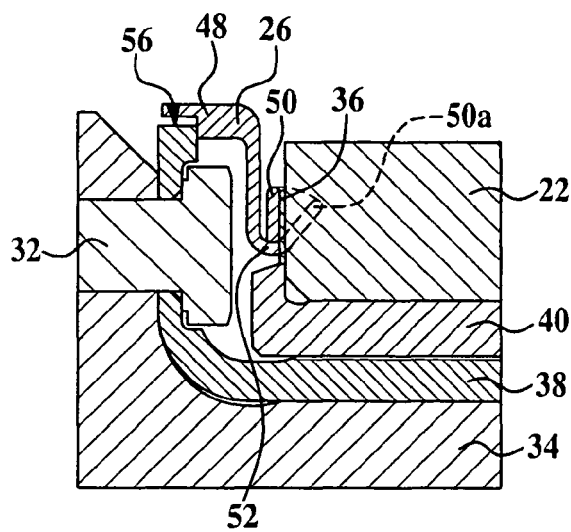
FIGS. 13 and 14 are enlarged views of the sections respectively designated as 13 and 14 in FIG. 5 when the pitch joint is in a static state, the view in FIG. 14 having been rotated away from the fastener to show a different portion of the seal.
Figure 14:
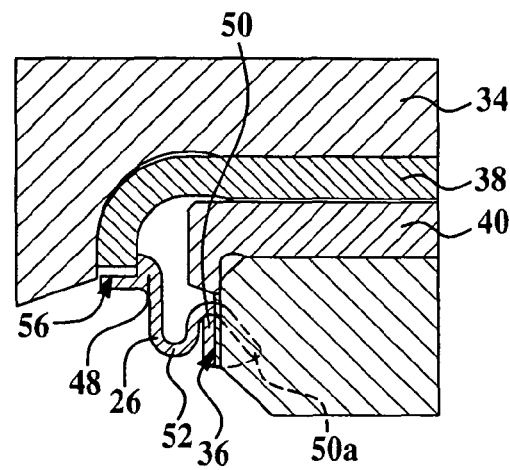

Referring now also to FIGS. 13 and 14, the seal 26 is mounted in a compressed state between the pitch bearing 38 and the pitch housing 22. More specifically, the first end 48 of seal 26 includes a cut-out 56 in which one end of the pitch bearing 38 is received. A layer of adhesive (not shown) is used to bond the first end 48 to the pitch bearing 38, thereby forming a closure around the entire periphery of the first end 48 of the seal 26.

The intermediate section 52 of the seal 26 floats in the open space between the end of the pitch housing 22 and the pitch bearing 38. The second end 50 of seal 26 tightly engages and seals against the end of the pitch housing 22. More particularly, the rub surface 58 (FIGS. 9 and 10) seats against a sacrificial layer 36 of low friction material such as Teflon®, which extends around the entire periphery of the pitch housing 22. As a result of the bellows-like intermediate section 52 of the seal 26, and the resilient nature of the seal 26 material, the rub surface 54 is biased into continuous, sealing engagement with the sacrificial coating 36 so as to form a continuous seal around one end of the bearing 38. The normal, expanded position of the second end 50 of seal 26 is designated by the numeral 50a.

Figure 15:
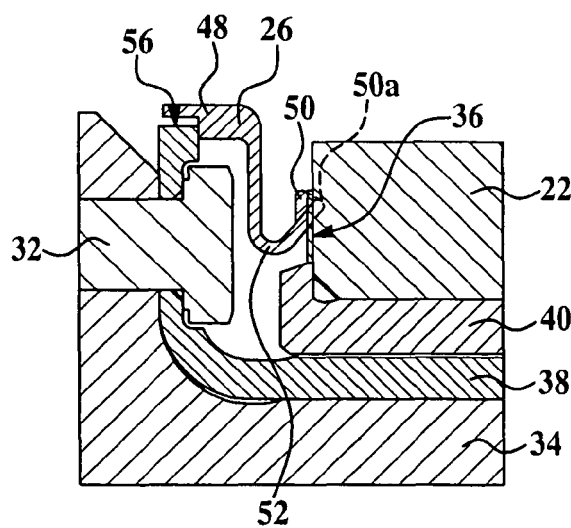
FIGS. 15 and 16 are similar to FIGS. 13 and 14, respectively, but showing the pitch joint in a dynamic state.
Figure 16:
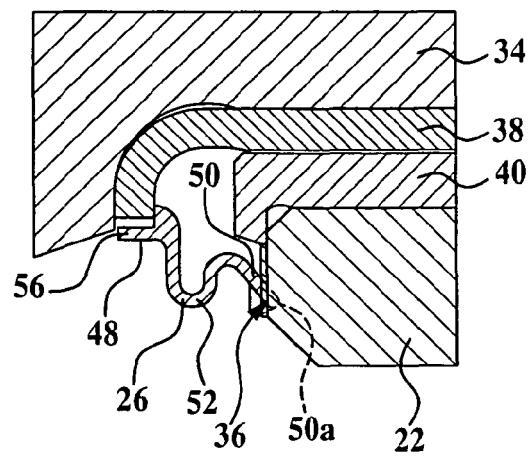

FIGS. 13 and 14 depict the pitch joint in a static state when the blade assembly 20 is not rotating at high speed. The dynamic state of the pitch joint is shown in FIGS. 15 and 16 in which the blade assembly 20 is rotating rapidly. Centrifugal force causes the pitch housing 22 to be displaced radially a short distance, thereby increasing the gap between the pitch housing 22 and the end of the pitch bearing 38. As the pitch housing 22 is radially displaced, the spring-like nature of seal 26 causes the second end 50 to move outwardly so as to maintain sealing engagement with the pitch housing 22. Conversely, when the blade assembly 20 slows, reaching a near static state, the radially inward movement of pitch housing 22 causes the seal 26 to compress, as shown in FIGS. 13 and 14.

The seal 26 is installed in the pitch joint in a compressed condition and remains compressed even after centrifugal force due to blade rotation attempts to open the pitch joint. The shape of the cross section of the seal 26 transitions from the shape of the pitch bearing's periphery to a completely circular shape on the outboard end. It should be recognized that other shapes may be used on the static, inboard side of the pitch joint in order to accommodate differing geometries used to fasten the pitch bearing 38 to the pitch shaft 34.

The seal of the present invention may be installed in pitch joints at the time of original manufacture, or as a retrofit on existing rotor blade assemblies. Where the seal 26 is used in retrofit applications, it is possible to apply the sacrificial layer 36 of wear material by cutting strips of the material and attaching them to the pitch housing 22 by means of adhesive. It should also be noted that the seal 26 may be installed over pre-existing seals covering the pitch bearings, either at the time of original manufacture or on a retrofit basis.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A containment seal for a bearing forming part of a joint in a helicopter rotor blade assembly, comprising:
   a unitary body protectively covering the bearing, the body having a first end, a second end, and an intermediate section between the first and second ends,
   the first end being secured to a stationary portion of the joint,
   the second end having a lip slidably engaging a movable portion of the joint,
   the intermediate section being axially expandable between the stationary and movable portions of the joint and urging the second end into sealing engagement with the movable portion of the joint;
   wherein the periphery of the first end includes an enlarged section overlying a fastener securing the bearing to the stationary portion of the joint.

2. The containment seal of claim 1, wherein the intermediate section includes flexible bellows allowing the body to expand in a direction toward the movable portion of the joint.

3. The containment seal of claim 1, wherein the lip includes a rub surface for rubbing against the movable portion of the joint.

4. The containment seal of claim 3, further comprising a layer of sacrificial wear material on the movable portion of the joint, the rub surface on the lip rubbing against the wear surface.

5. The containment seal of claim 4, wherein the wear material includes polytetrafluoroethylene (PTFE).

6. The containment seal of claim 1, wherein the lip extends around the entire circumference of the second end.

7. The containment seal of claim 1, wherein the intermediate section comprises resilient material held in a state of compression between the stationary and movable portions of the joint.

8. The containment seal of claim 1, wherein the intermediate section is essentially annular in shape.

9. The containment seal of claim 1, further comprising a layer of adhesive bonding the first end to the stationary portion of the joint.

10. A helicopter rotor blade assembly containment seal for protecting a bearing in a pitch control joint, said pitch control joint having a first portion and a second portion displaceable away from the first portion to increase a distance therebetween, said seal comprising:
    a first end secured to the first portion of the joint and forming a generally annular closure at the first end, wherein the periphery of the first end includes an enlarged section overlying a fastener securing the bearing to a stationary portion of the joint, said first portion of the joint stationary;
    a second end engaging the second portion of the joint and forming a generally annular closure at the second end, said second end flexible; and,
    a resilient intermediate section compressed between the first and second ends, the intermediate section protectively surrounding the bearing and biasing the second end into continuous sealing engagement with the displaceable second portion of the joint.

11. The seal of claim 10, wherein the intermediate section includes flexible fold of material allowing the seal to expand and contract.

12. The seal of claim 10, wherein the second end includes a lip having a rub surface continuously engaging the second portion of the joint as the second portion of the joint is displaced away from the first portion of the joint.

13. The seal of claim 12, wherein the lip extends around the entire circumference of the second end.

14. The seal of claim 12, further comprising a layer of sacrificial wear material on the second portion of the joint, the rub surface on the lip rubbing against the wear surface.

15. The containment seal of claim 14, wherein the wear material includes polytetrafluoroethylene (PTFE).

16. The containment seal of claim 10, wherein the intermediate section comprises an expandable fold of material.

17. The containment seal of claim 10, wherein the first end of the seal is secured to the first portion of the joint by layer of adhesive.

18. An aircraft rotor blade assembly seal for protecting a bearing in an expandable pitch control joint from environmental contaminants, comprising:
    an annularly shaped body protectively surrounding the bearing and having first and second ends respectively forming first and second closures between the body and the joint, wherein the periphery of the first end includes an enlarged section overlying a fastener securing the bearing to a stationary portion of the joint,
    the body including a flexible, resilient portion held in compression within the joint, the body being expandable with the joint to maintain the first and second closures when the joint expands to increase a distance between the stationary portion of the joint and a displaceable portion of the joint.

19. The seal of claim 18, wherein the seal is formed from a hydrogenated rubber.

20. The seal of claim 18, wherein the resilient portion includes a bellow.

21. The seal of claim 18, wherein the first end of the body is secured to the joint by adhesive.

22. The seal of claim 18, wherein the second end of the body includes a lip biased against and slideably engaging the joint around the entire periphery of the bearing.

23. The seal of claim 22, further comprising a layer of sacrificial wear material on the joint, and the lip includes a rub surface rubbing against the wear surface.

24. The seal of claim 23, wherein the wherein sacrificial wear material includes polytetrafluoroethylene (PTFE).

* * * * *